United States Patent

[11] 3,616,871

| [72] | Inventor | Shannon V. West Pensacola, Fla. |
|---|---|---|
| [21] | Appl. No. | 875,666 |
| [22] | Filed | Nov. 12, 1969 |
| [45] | Patented | Nov. 2, 1971 |
| [73] | Assignee | J. B. Hopkins Pensacola, Fla. a part interest |

[54] VEHICLE BUG DEFLECTOR
4 Claims, 3 Drawing Figs.

[52] U.S. Cl........................................ 180/54 A,
                    98/2 F, 180/69 C, 296/91
[51] Int. Cl......................................... B60j 1/20,
                                                   B60k 11/06
[50] Field of Search............................ 296/1 S, 91;
                    180/69 C, 54 A; 98/2 F

[56] References Cited
UNITED STATES PATENTS

| 1,865,675 | 7/1932 | Cavanaugh.............. | 296/91 UX |
| 1,868,142 | 7/1932 | Heaton..................... | 98/2 F |
| 1,936,776 | 11/1933 | Swain....................... | 98/2 F |
| 2,124,925 | 7/1938 | McNeal..................... | 98/2 F |
| 2,133,927 | 10/1938 | Riel......................... | 296/91 |
| 2,223,378 | 12/1940 | Martin...................... | 296/91 |

FOREIGN PATENTS

| 749,596 | 5/1933 | France..................... | 296/91 |
| 1,034,340 | 4/1953 | France..................... | 180/54 A |
| 1,357,976 | 3/1964 | France..................... | 98/2 F |

Primary Examiner—Benjamin Hersh
Assistant Examiner—Leslie J. Paperner
Attorneys—Clarence A. O'Brien and Harvey B. Jacobson ABSTRACT: A flow-converging duct mounted on the underside of a vehicle hood extends completely across the top of the engine compartment to conduct an inflow of air through a screened opening located above the radiator and grill. Air at an increased velocity is discharged upwardly from the exhaust opening of the duct in front of the windshield to establish an air curtain deflecting debris and insects that would otherwise obstruct vision.

PATENTED NOV 2 1971 3,616,871
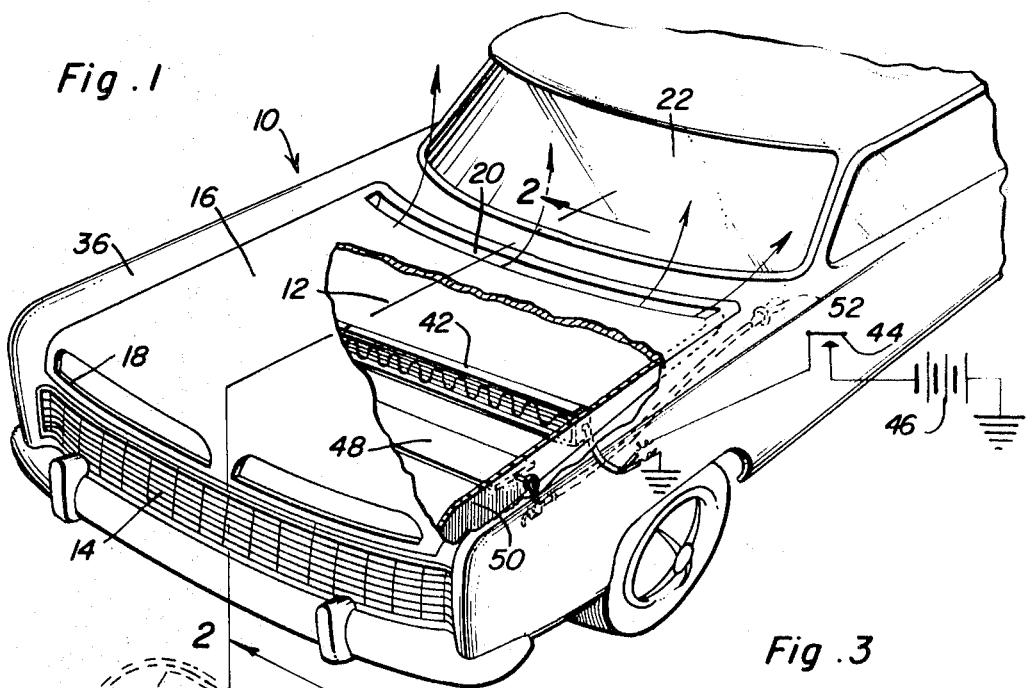
Fig. 1
Fig. 3
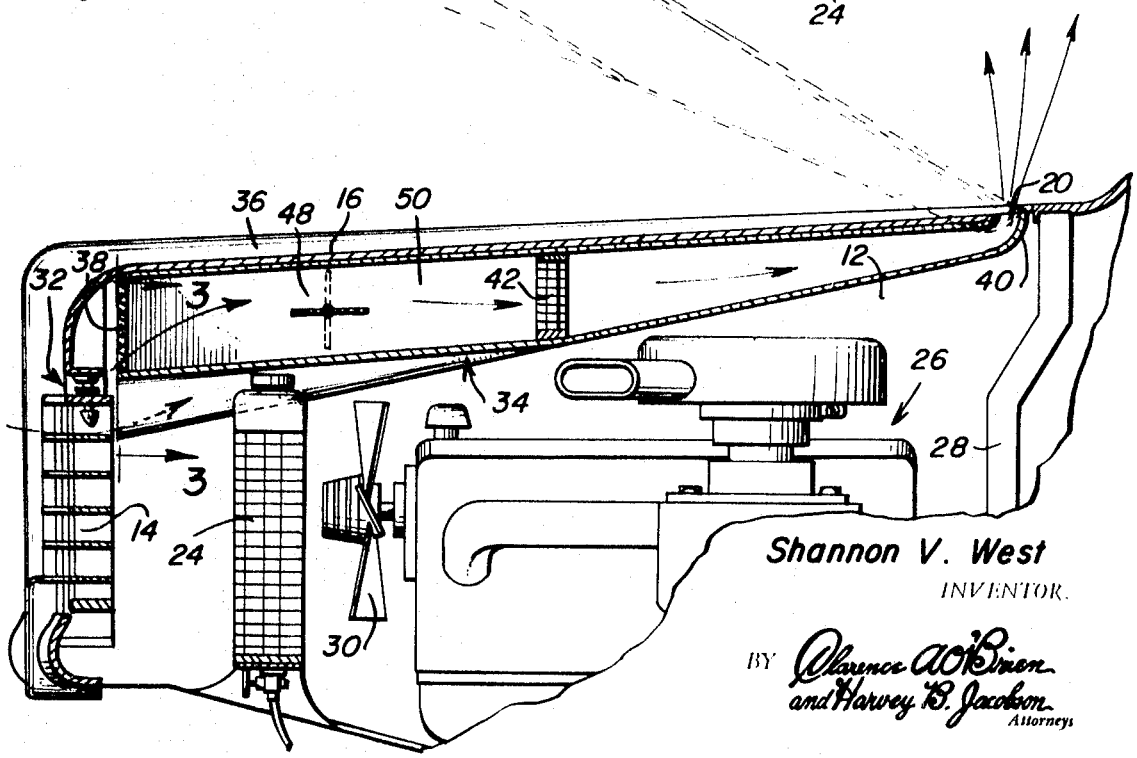
Fig. 2
Shannon V. West
INVENTOR.
BY *Clarence A. O'Brien*
*and Harvey B. Jacobson*
Attorneys

VEHICLE BUG DEFLECTOR

This invention relates to an attachment for the hood of an automotive vehicle engine compartment by means of which a curtain of air is established in front of the windshield during forward travel of the vehicle.

Although airflow deflectors for automotive vehicles have been heretofore proposed, they have not been particularly practicable or effective for the intended purpose. It is therefore an important object of the present invention to provide an attachment for the vehicle hood which is economical and effective for its primary intended purpose as well as advantageous in other respects.

In accordance with the present invention, a flow-convergent duct is attached to the underside of the engine compartment hood and extends completely over the engine compartment from a location above the front grill of the vehicle to substantially the firewall of the engine compartment. Thus, during movement of the vehicle, the duct will conduct an inflow of air under ram pressure without any pressure reduction from the fan-induced inflow of air through the radiator. The air is discharged upwardly at an increased velocity from an outlet end of the duct to establish the aforementioned air curtain. The intake portion of the duct is screened to prevent inflow of debris and insects while the outlet portion is unobstructed. The duct also acts to insulate the engine compartment while the upward discharge of air produces a downward reaction to increase the traction of the vehicle. Heating means may be mounted internally of the duct for defrosting purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a typical automotive vehicle with parts broken away showing installation of the present invention.

FIG. 2 is an enlarged partial sectional view taken substantially through a plane indicated by section line 2—2 in FIG. 1.

FIG. 3 is a partial transverse sectional view taken substantially through a plane indicated by section line 3—3 in FIG. 2.

Referring now to the drawings in detail, FIG. 1 illustrates a typical automotive vehicle generally denoted by reference numeral 10. An engine compartment 12 is enclosed within the forward end portion of the vehicle rearwardly of its front grill 14 and below a hood 16 modified in accordance with the present invention so as to be provided with intake scoop openings 18 located above the front grill and an unobstructed outlet opening 20 spaced forwardly of the rearwardly slanting windshield 22.

Referring now to FIGS. 2 and 3, it will be noted that the engine compartment 12 houses the usual components associated with the vehicle power plant such as the radiator 24 located rearwardly of the front grill and forwardly of the internal combustion engine 26. The engine is spaced forwardly of the firewall 28 separating the engine compartment from the passenger compartment. Also, the engine mounts the usual fan assembly 30 through which an inflow of air is induced through the front grill 14 and the radiator 24 for water-cooling purposes. The engine compartment is closed by the hood 16 which is normally locked in position by a centrally located hood-latching mechanism 32. The hood may of course be pivotally opened as shown by dotted line in FIG. 2.

Directly attached to the undersurface of the hood by any suitable means as by welding, is a flow-converging duct structure generally referred to by reference numeral 34. The duct extends laterally and completely across the engine compartment between the fenders 36 of the vehicle coextensive with the hood 16. Further, the duct extends along the longitudinal axis of the vehicle between the front grill 14 and the firewall 28. However, in accordance with the present invention, the duct is located above the front grill and the radiator 24 as well as the engine 26. At the forward end, the duct is provided with an intake portion formed by a screened opening 38 defining a predetermined inflow area disposed in a plane perpendicular to the direction of travel of the vehicle. The cross-sectional flow area generally decreases toward a direction-changing outlet portion 40 of the duct aligned with the opening 20 in the hood for upward discharge of air substantially along the entire width of the engine compartment. The flow area ratio of the intake to outlet portion of the duct is such as to produce a substantial increase in the flow velocity of air conducted through the duct so that even at maximum speeds of the vehicle, the air curtain established by the upward discharge of air will be spaced forwardly of the windshield 22. Further, since the screened intake end portion 38 of the duct is aligned with the inlet openings 18 in the hood and located above the front grill 14 and radiator 24, the inflow rate of air will not be adversely affected by any suction pressure produced by the fan assembly 30 at the front grill. Accordingly, the full effective ram pressure developed during forward travel of the vehicle will be available to produce a flow of air through the duct 34 that is increased in velocity as it travels to the outlet end portion 40.

It will be apparent, that the airflow through the duct 34 will operate as an effective insulation for the engine compartment. Thus, the duct attachment to the hood may replace undercoating and insulation otherwise placed on the undersurface of the hood to protect the surface coating on the hood from the heat produced by engine operation. Further, as a result of the upward discharge of air from the outlet end portion 40 of the duct into the high-pressure area above and to the rear of the outlet opening 20, the pressure of the high-pressure area is increased whereby a downward reaction force on the vehicle 10 is produced so as to increase the traction of the vehicle. This will be of advantage particularly during high speed travel of the vehicle.

In order to prevent icing during extremely cold weather, a suitable heating element 42 may be mounted within the duct. By way of example only, an electric-type heating element 42 is illustrated in FIG. 1 adapted to be energized upon closing of a switch 44 connecting the heating element to the vehicle source of electrical energy 46. Also, the inflow rate of air may be regulated or inflow completely blocked by means of a flow-regulating vane 48 pivotally mounted between the sidewalls 50 of the duct. A vane position control 52 is connected by the vane 48 so that the operator may control its position from the vehicle dashboard for example. By means of the vane 48, the vehicle operator may completely cut off flow through the duct when its use is not advisable. Further, by restricting the inflow rate of air, and energizing the heating element 42, a blast of heated air may be directed onto the windshield for deicing purposes. When the flow-regulating vane 48 is in the position illustrated by solid line in FIGS. 1 and 2, the curtain of air discharged upwardly from the outlet end portion of the duct will then be spaced from the windshield for deflection of debris and insects. Thus, the vehicle hood attachment of the present invention will have several distinct advantages to justify its installation. Also, it may be readily and effectively cleaned by merely introducing water into the duct structure through its outlet end portion.

It should be appreciated that the duct heater could be of the hot water type utilizing the heat of the cooling water in the radiator or a heat exchanger obtaining heat from the exhaust gas. Also, the hood could be hinged in front. Further, the under portion of at least the forward end portion of the duct 34 defines a downwardly opening channel in which the upper end of the radiator 24 is embracingly received, see FIGS. 2 and 3, whereby ram air passing through the grill 14 below the duct 34 will be restricted against passage over the upper portion of the radiator 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle of the type including a forward upwardly and forwardly opening compartment disposed forward of a transverse firewall and closed throughout its upper portion by means of an upwardly swingable hood terminating at its forward end portion along the upper marginal portion of a forward upstanding transverse grill at the forward extremity of the engine compartment, said engine compartment including a central upstanding engine coolant radiator disposed therein spaced slightly rearwardly of said grill, an elongated air duct extending longitudinally of and supported from said hood beneath the latter in the upper extremity of said engine compartment with the forward end of said duct extending over and forwardly beyond the top of said radiator so the forward end portion of said hood, the forward end of said duct being open and including at least a portion of the open forward end thereof horizontally registered with an upper portion of said grill for receiving ram air passing therethrough, the rear end of said duct opening upwardly through the rear end of said hood for discharging ram air from said duct upwardly in front of an upstanding vehicle windshield disposed to the rear of and above the rear extremity of said hood, the under portion of at least the forward end portion of said duct defining at least a shallow downwardly opening and front to rear extending channel in which the upper portion of said radiator is embracingly received, whereby said duct serves not only as an inlet for ram air to be jetted upwardly from the rear end portion of said hood, but also as a baffle at least substantially preventing the inflow of air passing through said grill assembly in alignment with said radiator from being diverted upwardly and over, and thus bypassing, said radiator.

2. The combination of claim 1 including means for heating the air conducted through the duct.

3. The combination of claim 2 including means for adjustably restricting the flow of air through the duct.

4. The combination of claim 1 wherein said hood is provided with inlet scoops aligned with the a portion of the duct forward end above the intake grill.

* * * * *